United States Patent [19]

Fluharty et al.

[11] Patent Number: 4,824,159

[45] Date of Patent: Apr. 25, 1989

[54] PIVOTED ROTATABLE ILLUMINATED REAR SEAT VANITY MIRROR

[75] Inventors: William J. Fluharty; Ronald A. Dykstra; Mark W. Hawks, all of Holland, Mich.

[73] Assignee: Prince Corporation, Holland, Mich.

[21] Appl. No.: 100,269

[22] Filed: Sep. 23, 1987

[51] Int. Cl.$^4$ ............................................. B60R 27/00
[52] U.S. Cl. ................................. 296/37.7; 350/604; 248/278; 248/324; 296/1.1
[58] Field of Search .............. 296/37.7, 1 R; 350/604, 350/605, 606, 611, 612, 623, 626, 631, 632, 634, 635, 636, 639, 640; 248/278, 324, 479, 484, 485, 486, 487, 494; 362/135, 136, 137, 142; 224/42, 45 R; 312/226, 227, 245, 248

[56] References Cited

U.S. PATENT DOCUMENTS

| | | | |
|---|---|---|---|
| D. 223,885 | 6/1972 | Branski | 362/136 X |
| 1,819,516 | 8/1932 | Kelly | 296/37.7 |
| 2,001,743 | 5/1935 | Morrison | 362/144 |
| 2,060,062 | 5/1933 | Fischer | 248/479 X |
| 3,834,782 | 9/1974 | Pampinella | 312/248 |
| 4,070,054 | 1/1978 | Cziptschirsch | 296/97 K |
| 4,573,655 | 3/1986 | Vulic | 248/278 |
| 4,624,499 | 11/1986 | Flowerday | 296/97 H |
| 4,652,982 | 3/1987 | Flowerday | 362/135 |
| 4,663,849 | 5/1987 | Nickelson | 248/324 |
| 4,681,366 | 7/1987 | Labanoff | 297/191 |

FOREIGN PATENT DOCUMENTS

| | | | |
|---|---|---|---|
| 2710569 | 9/1978 | Fed. Rep. of Germany | 350/604 |
| 3703509 | 9/1987 | Sweden | 296/97 K |

Primary Examiner—James B. Marbert
Assistant Examiner—John M. Gruber
Attorney, Agent, or Firm—Price, Heneveld, Cooper, DeWitt & Litton

[57] ABSTRACT

A vanity mirror can be extended from the vehicle headliner and upon extension, can be pivoted about a generally vertical axis such that a single vanity mirror can be used by any of the rear seat passengers. In the preferred embodiment of the invention, the vehicle roof includes a recess for receiving an illuminated vanity mirror assembly which is pivotally mounted at one edge to the recess for movement between a stored position substantially flush with a vehicle roofline to a lowered use position substantially orthogonal to the vehicle roof.

18 Claims, 2 Drawing Sheets

PIVOTED ROTATABLE ILLUMINATED REAR SEAT VANITY MIRROR

BACKGROUND OF THE PRESENT INVENTION

The present invention relates to an illuminated vanity mirror and particularly one for use by rear seat passengers of a vehicle.

Illuminated vanity mirror visors have become popular in vehicles, but are designed primarily for use by front seat passengers. In an effort to accommodate rear seat passengers, a variety of proposals have been made. One is to provide an illuminated vanity mirror located in the vehicle roof forwardly and in alignment with each of the rear passenger seats and which pivots downwardly from the roof for use. Typically, rear seats are hot divided into bucket seating areas as are front seats and therefore, if a third passenger is seated in the rear seat, even an installation of two of these units will not provide convenient usability to a third passenger located in the center of the rear seat of a vehicle. Also it is well known to mount an illuminated vanity mirror to the rear or in the headrest of the front passenger seat for use by the rear passenger aligned with the seat. With either of these prior rear seat vanity mirrors, however, multiple units are necessary for use by each of the passengers and they do not provide a usable system for a passenger located in the center of the rear seat.

SUMMARY OF THE PRESENT INVENTION

The system of the present invention provides a vanity mirror which can be extended from the vehicle headliner and upon extension, can be pivoted about a generally vertical axis such that a single vanity mirror can be used by any of the rear seat passengers. In a preferred embodiment of the invention, the vehicle roof includes a recess for receiving an illuminated vanity mirror assembly which is pivotally mounted at one edge to the recess for movement between a stored position substantially flush with a vehicle roofline to a lowered use position substantially orthogonal to the vehicle roof. In the preferred embodiment, also, a pair of conductive pivot axle means coupling the illuminated vanity mirror assembly to the recess within the vehicle roof also provide conductors for applying electrical operating power to the lamp means associated with the illuminated vanity mirror. Also torque clip means are provided which cooperate with the pivot axle means and the mirror assembly for holding the assembly in a stored position within the recess and controlling the movement of the assembly.

These and other features, objects and advantages of the present invention will become apparent upon reading the following description thereof, together with reference to the accompanying drawings in which:

DETAILED DESCRIPTION OF THE PREFERRED EMBODIMENT

Figures 1, 2, 3:
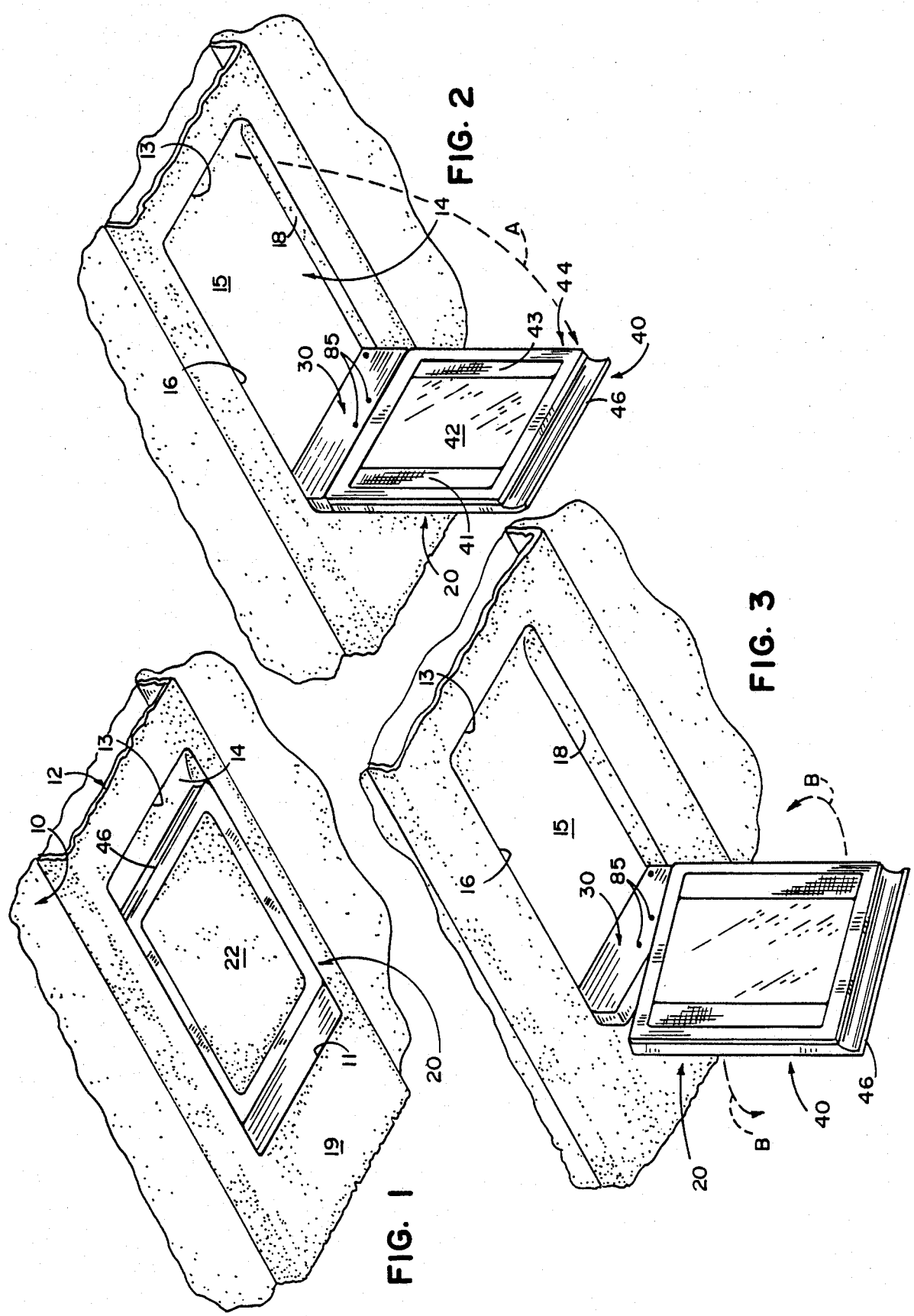
FIG. 1 is a fragmentary perspective view of the illuminated vanity mirror assembly of the present invention shown in a stored position.
FIG. 2 is a fragmentary perspective view of the illuminated vanity mirror assembly of the present invention shown in a first position extended for use.
FIG. 3 is a fragmentary perspective view of the illuminated vanity mirror assembly of the present invention shown in an extended and pivoted second use position.

Referring initially to FIGS. 1-3, there is shown a roof section 10 of a vehicle such as an automobile which includes, in the preferred embodiment, a longitudinally extending center trunk or housing 12 which extends fore and aft in the vehicle and may include in the front seat area a variety of vehicle instruments, lights and the like. The section 10 shown in FIGS. 1-3 is located behind the front seat and centrally within the vehicle between the seats slightly forward of the rear seat. Housing 12 includes a recess 14 into which the illuminated vanity mirror assembly 20 of the present invention is removably stowed. Recess 14 is defined by sidewalls 16 and 18, a floor 15 and front and rear walls 11 and 13 to define a rectangular pocket into which the illuminated vanity mirror assembly 20 can be stored with its outer decorative cover 22 substantially flush with the upholstered surface 19 of housing 12.

The illuminated vanity mirror assembly 20 is moved from a stored position as illustrated in FIG. 1 to a lowered use position by pivoting it downwardly in a direction indicated by arrow A in FIG. 2 to extend in a generally vertical direction with respect to the horizontally extending roof 10. The illuminated vanity mirror assembly 20 can also be pivoted or rotated from side-to-side as illustrated by arrow B in either a clockwise direction or counterclockwise direction for use by rear seat passengers at either side of the vehicle. Thus, the centrally located illuminated vanity mirror assembly 20 can be used by any of the rear seat passengers and is fully adjustable to accommodate such use.

Figure 6:
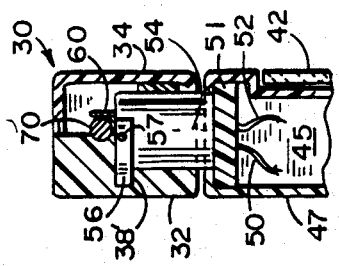
FIG. 6 is a fragmentary cross-sectional view taken along section line VI—VI of FIG. 5.
Figure 4:
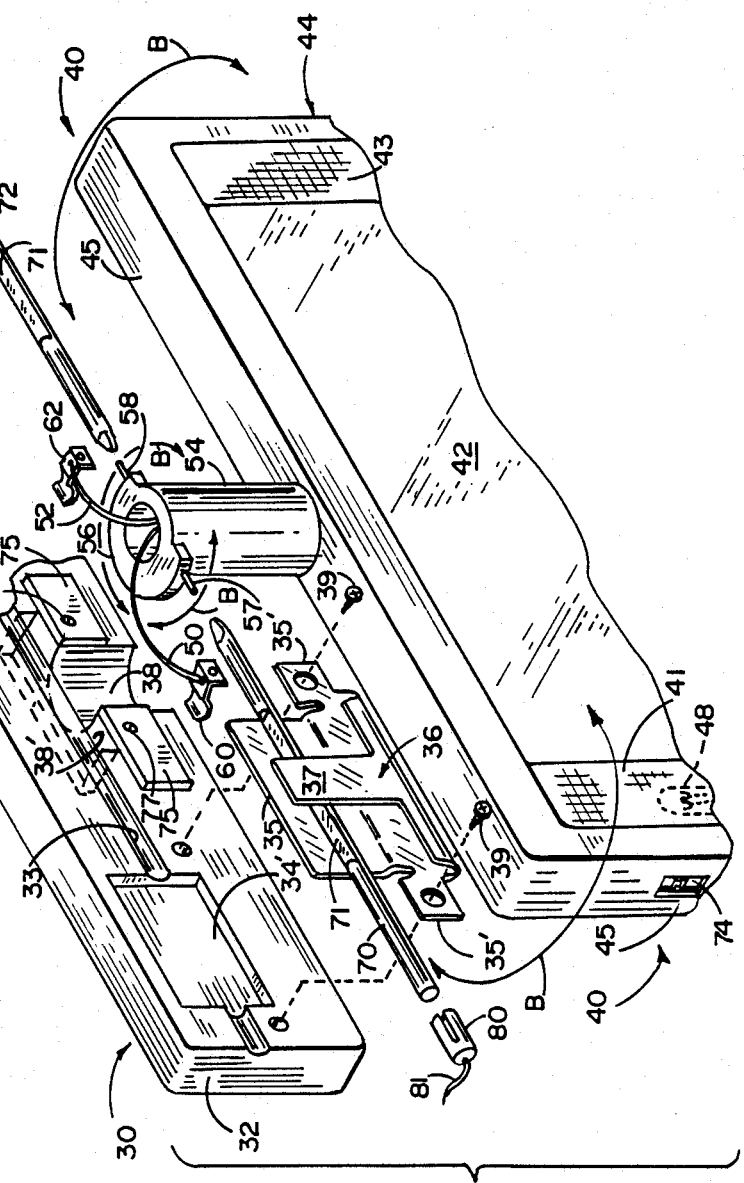
FIG. 4 is an enlarged fragmentary perspective view partly broken away and exploded showing the pivot mounting structure for the illuminated vanity mirror assembly of the present invention.

The illuminated vanity mirror assembly 20 includes two subassemblies, a mounting subassembly 30 which is pivotally mounted between the sidewalls 16 and 18 near the forward wall 11 of recess 14 and a lower housing assembly 40 which pivots with respect to assembly 30 as illustrated in FIG. 3 and which includes an illuminated vanity mirror 42 mounted within a generally rectangular frame 44 which also includes a pair of lens 41 and 43 extending along opposite edges of mirror 42 for providing illumination for use of the mirror in low ambient light conditions. Behind lens 41 and 43 are a plurality of lamps 48 (shown schematically and in phantom form in FIG. 4) for providing illumination for use of the vanity mirror 42. Frame 44 includes a front handle 46 which is spaced from floor 15 and wall 13 as best seen in FIG. 1 to allow the user to grasp the assembly 40 and lower the illuminated vanity mirror assembly from the recess to a use position as shown in FIG. 2 or rotate the assembly from side-to-side as illustrated in FIG. 3. Frame 44 can be made of a suitable polymeric material such as polycarbonate and 45 (FIG. 4) and a rear cover 47 (FIG. 6)

to define an interior space for accommodating lamps 48 and their associated wiring including conductors 50 and 52 as seen in FIG. 4. The lamps 48 can be mounted within frame 44 in a manner similar to that disclosed in U.S. Pat. No. 4,624,499 or by some conventional mounting means.

Extending centrally upwardly from the top surface 45 of housing 40 is a cylindrical pivot member 54 which is rigidly secured to frame 44 and surrounds an aperture in surface 45. Conductors 50 and 52 extend through member 54 as seen in FIG. 4 and are coupled to lamps 48 within the frame 44 via a switch 74. Member 54 terminates in a semicircular flange 56 located at the top and rear edge of the member. Flange 56 rides on the upper surface 38' of socket 38 in member 30 once installed for axially holding member 40 to member 30 as best seen in FIG. 6. Flange 56 includes a pair of outwardly projecting pins 57 and 58 which serve as stops limiting the rotation of assembly 40 by engaging front and rear surfaces 32 and 34 of housing 30 as can best be seen in FIG. 6. Member 54 is a hollow cylinder and is reinforced at its mounting to the relatively thin upper wall 45 of frame 44 by means or a reinforcing plate 51 extending adjacent upper wall 45 as best seen in FIG. 6 to add strength to the member 54 which is the sole support for the lower assembly 40 with respect to the upper assembly 30.

Conductors 50 and 52 supplying electrical operating power to lamps 48 terminate in wiper spring contacts 60 and 62, respectively, which are mounted to wall 32 (FIG. 5) and engage conductive pivot rods or axles 70 and 72 which extend within housing 30 as described below. Electrical clips 80 and 82 are attached to the ends of axles 70 and 72 and are coupled to conductors 81 and 83, respectively, which in turn are coupled to the vehicles' electrical supply system. Spring clips 80 and 82 thus provide continuous electrical contact as do clips 60 and 62 for supplying electrical power to conductors 50 and 52. A slide switch 74 (FIG. 4) can be actuated by the user for providing illumination from mirror 42. Switch 74 can be a double pole switch for selectively applying power to one or more lamps 48 behind each of the lens 41 and 43 for providing high or low intensity illumination as desired. Also switch 74 could be a mercury switch such that the lamps 48 are illuminated automatically when the assembly 20 is lowered.

Figure 7:
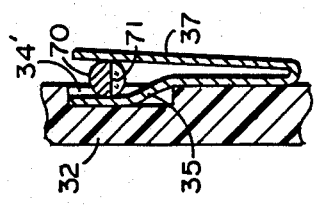
FIG. 7 is an enlarged fragmentary cross-sectional view taken along section line VII—VII of FIG. 5.
Figure 8:
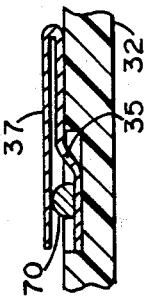
FIG. 8 is an enlarged fragmentary cross-sectional view of the structure shown in FIG. 7 shown with the illuminated vanity mirror assembly in a raised stored position.

The pivot rods or axles 70 and 72 are mounted within semicircular recesses 33 formed in the rear wall 32 of housing 30 which includes generally rectangular pockets 34' for receiving generally U-shaped torque fittings 36 which include a pair of integral compression arms 35 and 37 which selectively engage a flat 71 on pivot rod 70 or 72 as best seen in FIGS. 7 and 8 to provide a detent as seen in FIG. 8 for holding the assembly 20 in a raised stored position within the recess 14. The spring steel torque fittings 36 are generally tightly U-shaped with legs 37 and 35 integrally joined at a lower end. Leg 35 is somewhat offset as best seen in FIGS. 7 and 8 to define a gap between the legs to compressibly engage the pivot rods 70 and 72. Leg 35 also includes a pair of outwardly projecting tangs 35' (FIG. 4) having apertures therein for receiving fastening screws 39 for anchoring the torque fitting 36 within the pocket 34' of wall 32 of housing 30. The pair of torque fittings can provide a predetermined torque for controlled movement of assembly 20 in a range of from about 1–10 inch-pounds with 6 inch-pounds being preferred for the particular embodiment shown.

Figure 5:
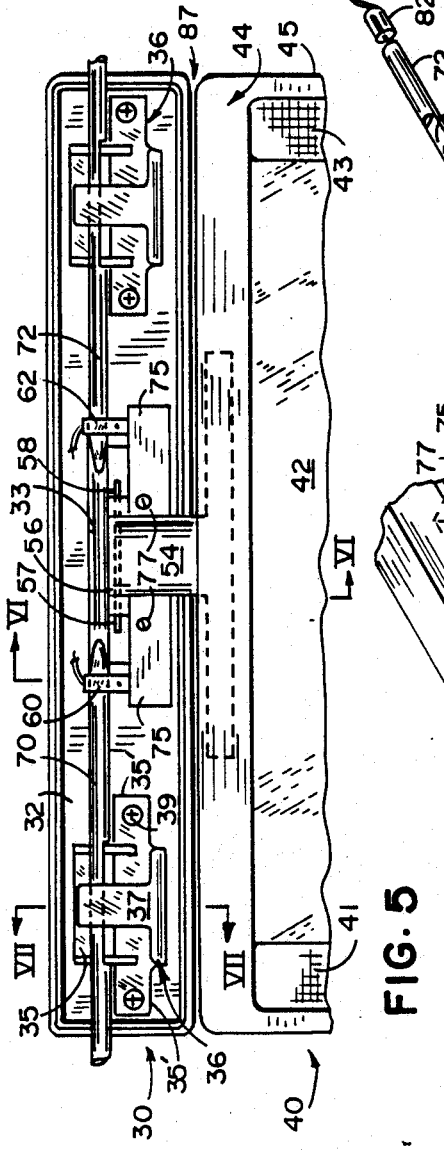
FIG. 5 is a fragmentary front elevational view of the assembled pivot mechanism for the illuminated vanity mirror assembly of the present invention.

Pivot member 54 is rotatably mounted within a semicylindrical socket 38 formed in housing wall 32 and is captively and frictionally held by means of a pair of mounting plates 75 once inserted therein. Plates 75 are held in position by means of fastening screws 77 as best seen in FIGS. 4 and 5.

Each of the torque fittings 36 thus are fixedly secured to the rear wall 32 of housing 30 and pivot together with housing 30 and the attached illuminated vanity mirror housing 40 with respect to the vehicle. The pivot axles 70 and 72 are fixedly mounted within the sidewalls 16 and 18 of the housing 12 by suitable conventional fastening means such as by mounting brackets or the like which engage and lock the axles in fixed position therewith so that they do not rotate during operation of the vanity mirror assembly 20. The section of housing 12 defining recess 14 can be integrally molded with fixed pivot axles as a subassembly which subsequently is mounted to a cutout in the vehicle headliner if desired or can be part of the overall console or trunk 12 as illustrated in FIGS. 1–3.

The front wall 34 of housing 30 is attached after the housing 30 has been assembled to the pivot axles 7 and 72 by means of a pair of fastening screws 85 (FIGS. 2 and 3), thus the unit is assembled by fitting the torque fittings 35 over the pivot rods 70 and 72 and properly aligning them with respect to pockets 34' in rear wall 32 of housing 30 which has been pre-attached to member 54 by brackets 75. The torque fittings 36 are then secured in place by fastening screws 39 and the cover 34 fastened over the upper housing. Member 54 and its flange 56 holds the lower unit 40 within housing 30 and has a length sufficient to provide a slight gap 87 (FIG. 5) between the upper wall 45 of assembly 40 and the lower surface of housing 30 such that the mirror can be rotated with relative ease. Plates 75 provide a frictional engagement against the cylindrical surface of member 54 to provide a predetermined rotational torque such that once the vanity mirror 42 has been adjusted to a desired use position, it will remain in such position. The parts of the upper and lower housings 30 and 40 can be molded of a suitable polymeric material such as polycarbonate to withstand the environment of the vehicle and the heat of lamps 48.

It will become apparent to those skilled in the art the various modifications to the preferred embodiment of the invention as described herein and can be made without departing from the spirit or scope of the invention as defined by the appended claims.

The embodiments of the invention which have an exclusive property or privilege claimed are defined as follows:

1. A vanity mirror assembly for use by rear seat passengers of a vehicle comprising:
   a frame including a mirror mounted therein; and
   means for coupling said frame to a vehicle roof in an area rearwardly of the front seats such that said mirror can be used by rear seat passengers, said coupling means allowing movement of said frame in mutually orthogonal axes between a stored position adjacent the vehicle roof to a lowered use position and rotated once lowered for use by rear seat passengers on either side of the vehicle.

2. The apparatus as described in claim 1 wherein said coupling means comprises a mounting housing including a pair of pivot axles extending therefrom for pivoting said frame from said stored position.

3. The apparatus as described in claim 2 wherein said coupling means further comprises a cylindrical member extending from said frame and captively and rotatably coupled to said mounting housing for permitting rotation of said frame with respect to said mounting housing.

4. The apparatus as described in claim 3 wherein said frame includes means for illuminating said mirror for use under low ambient light.

5. The apparatus as described in claim 4 and further including torque clip means extending between said pivot axles and said mounting housing for providing controlled torque therebetween.

6. The apparatus as described in claim 5 wherein said pivot axles include a flat surface formed thereon which cooperate with said torque clip for holding said frame in a raised stored position.

7. The apparatus as described in claim 6 wherein said torque clip comprises a generally U-shaped member of spring steel having a pair of integral legs wherein one of said legs is curved away from the other at a location spaced from the junction of said legs to define a gap between said legs for compressibly receiving said pivot axle therebetween, and wherein one of said legs includes mounting tang means having an aperture formed therein for attaching said torque clip to said mounting housing for movement about the pivot axle with a predetermined torque.

8. The apparatus as described in claim 7 and further including a second housing defining a recess for mounting it to the vehicle roof for receiving said frame and mounting housing within said recess.

9. A vanity mirror assembly for mounting to a roof of a vehicle comprising:
   a housing mounted to the center area of a vehicle roof and having a recess for receiving a vanity mirror assembly for storage therein;
   a first member mounted within said recess for pivotal movement about a first axis generally parallel to the vehicle roof between a stored position within said recess and a use position at least partially extended from said housing;
   a second member pivotally mounted to said first member for pivotal movement about a second axis generally perpendicular to said first axis;
   a vanity mirror mounted to said second member such that a person can lower said mirror from the vehicle roof by pivoting said first member with respect to the vehicle roof and rotate the mirror to a desired position for use by rotating said second member with respect to said first member; and
   illumination means mounted to said second member for providing illumination for use of said mirror.

10. The apparatus as described in claim 9 wherein said second member includes a cylindrical pivot mounting member extending from one end thereof and wherein said first member includes socket means for pivotally holding said pivot mounting member.

11. The apparatus as described in claim 10 wherein said pivot mounting member includes a flange at an end remote from said second member for holding said second member in said socket.

12. The apparatus as described in claim 11 wherein said socket means of first member includes a semi-cylindrical recess and at least one bracket extending over an edge of said recess for holding said pivot mounting member therein.

13. The apparatus as described in claim 12 wherein said second member includes means for extending electrical conductors to said illumination means for illuminating said mirror for use of said mirror in low ambient light.

14. A vanity mirror assembly for use by rear seat passengers of a vehicle comprising:
   a housing mounted to the center area of a vehicle roof and having a recess for receiving a vanity mirror assembly therein;
   a first member mounted within said recess for movement in a first plane generally perpendicular to the vehicle roof between a raised stored position within said recess and a lowered use position;
   a second member pivotally mounted to said first member for movement in a plane generally perpendicular to said first plane wherein said second member includes a cylindrical pivot mounting member extending from one end thereof, wherein said first member includes socket means for pivotally holding said pivot mounting member, wherein said pivot mounting member includes a flange at an end remote from said second member for holding said second member in said socket; and wherein said socket means of first member includes a semi-cylindrical recess and at least one bracket extending over an edge of said recess for holding said pivot mounting member therein; and
   a vanity mirror mounted to said second member such that a rear seat passenger can lower said mirror from the vehicle roof by pivoting said first member with respect to the vehicle and rotate the mirror to a desired position for use by rotating said second member with respect to said first member, wherein said second member includes means for illuminating said mirror for use of said mirror in low ambient light; and wherein said pivot mounting member is hollow and said assembly includes electrical conductors extending through said pivot mounting member for supplying operating power to said illuminating means.

15. The apparatus as described in claim 14 wherein said first member includes pivot axle means for pivotally mounting said member to a vehicle.

16. The apparatus as described in claim 15 wherein said first member includes a torque clip extending between said member and said pivot axle means for controlling the pivoting of said first member.

17. The apparatus as described in claim 16 wherein said torque clip comprises a generally U-shaped member of spring steel having a pair of integral legs wherein one of said legs is curved away from the other at a location spaced from the junction of said legs to define a gap between said legs for compressibly receiving said pivot axle means therebetween, and wherein one of said legs includes mounting tang means having an aperture formed therein for attaching said torque clip to said first member for movement about the pivot axle with a predetermined torque.

18. The apparatus as described in claim 17 wherein said pivot axles include a flat surface formed thereon which cooperate with said torque clip for holding said assembly in a raised stored position.

* * * * *